Feb. 23, 1960 — F. A. KROHM — 2,925,615
WINDSHIELD WIPER BLADE ASSEMBLY
Filed April 8, 1953 — 2 Sheets-Sheet 1
Fig.-1
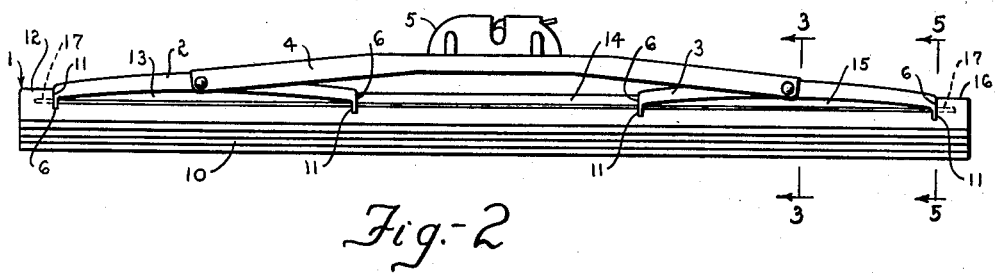
Fig.-2
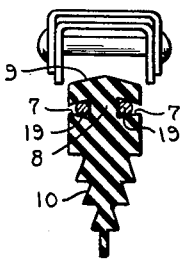 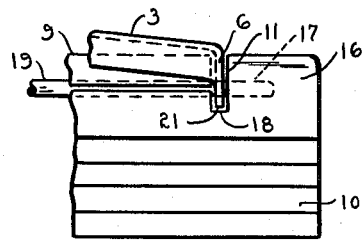 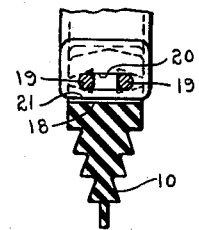
Fig.-3  Fig.-4  Fig.-5
 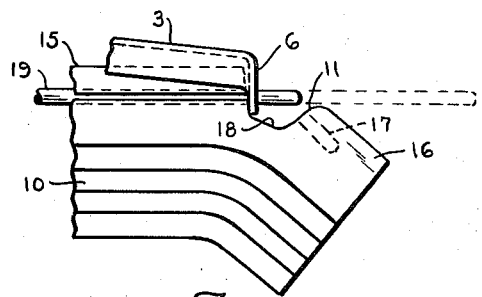
Fig.-6  Fig.-7
INVENTOR.
FRED A. KROHM
BY
Charles S. Penfold
ATTORNEY Feb. 23, 1960 F. A. KROHM 2,925,615
WINDSHIELD WIPER BLADE ASSEMBLY
Filed April 8, 1953 2 Sheets-Sheet 2
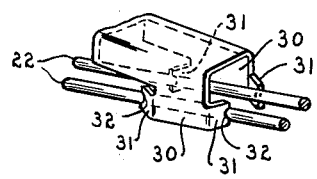
Fig.-8
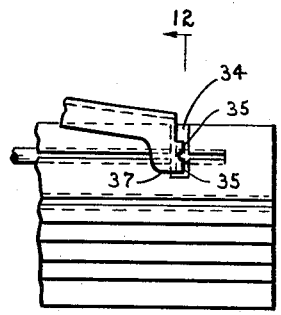
Fig.-11
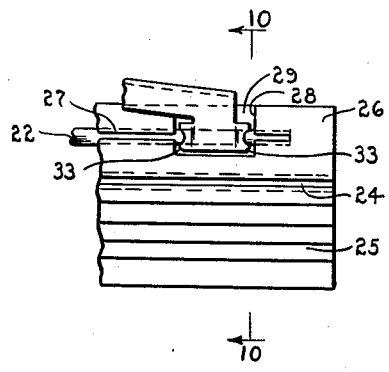
Fig.-9
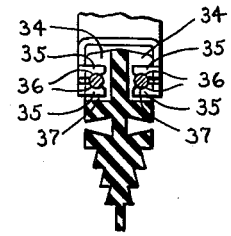
Fig.-12
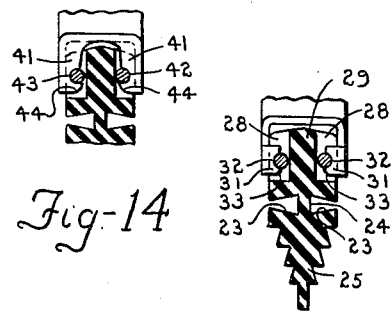
Fig.-10
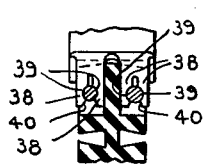
Fig.-13
Fig.-14
INVENTOR.
FRED A. KROHM
BY
Charles S. Penfold
ATTORNEY United States Patent Office 2,925,615
Patented Feb. 23, 1960

2,925,615
WINDSHIELD WIPER BLADE ASSEMBLY

Fred A. Krohm, Hobart, Ind., assignor to The Anderson Company, a corporation of Indiana Application April 8, 1953, Serial No. 347,572

21 Claims. (Cl. 15—245)

This invention relates generally to windshield wiper apparatus and more particularly is directed to a wiper blade assembly or unit.

At least one form of wiper blade assembly now in use for wiping flat and/or curved surfaces of windshields comprises a blade and a pressure-distributing device operatively connected to the blade. More specifically in this regard, the blade is preferably comprised of a resilient wiper element and a flexible support therefor, and the pressure-distributing device preferably includes a pair of secondary yokes having their ends pivotally connected to the blade and a primary yoke or bridge means having its extremities connected to intermediate portions of the secondary yokes. The primary yoke or bridge is provided with a connector detachably connectible with a fitting carried by a wiper arm.

In wiper blade assemblies of the above or similar character, the operative relationship of the secondary yokes with the blade and the primary yoke is such that in some instances, depending on weather conditions, snow will collect and pack between these parts to such an extent that the parts cannot move relative to one another. As a consequence, the blade assembly will not function properly, or conform to the curvature of the surface to be cleaned.

One objective of the present invention is to embody improved principles of design and construction in a blade assembly of the type above referred to whereby there is little or no opportunity for snow or other foreign matter to collect and interfere with the operation of the wiper blade assembly.

A significant object of the invention is to provide the ends of the secondary yokes with receiving or bearing means through which the flexible support extends to interconnect these yokes and the support in a manner whereby the blade may rock to some extent relative to the pressure device and/or the wiper element with respect to the support or pressure device. These particular relative movements and those occurring between the three yokes not only contribute to cause the wiper element to readily conform and efficiently clean a surface to be wiped, but serve to prevent the deposit or collection of any snow on the assembly and also break up and release any sleet or ice that might otherwise collect on the assembly.

An important object of the invention is to provide the ends of the secondary yokes with receiving means through which the flexible members of the support are extended for simultaneously holding the members in the grooves of the element and the pressure device detachably connected to the blade.

A significant object of the invention is to provide the resilient wiper element with integral portions which can be manipulated to receive and conceal the ends of the flexible members of the support and detachably lock the members in place.

Another object of the invention is to provide an arrangement whereby the secondary yokes are provided with receiving means and the flexible members of the support are held in relation to the receiving means by the inherent resilience of the wiper element.

A further object of the invention is to reduce to a minimum vibration and noise occurring between the movable components of the wiper assembly.

Other attributes of the invention reside in its simplicity of design and construction, economy of manufacture, durability, and efficiency of operation.

Many other objects and advantages of the invention will become evident when the description herein set forth is considered in conjunction with the drawings annexed hereto.

In the drawings:

Figures 1 through 7 exemplify one embodiment of the invention; Figures 8, 9 and 10 a modification; Figures 11 and 12 another modification; Figure 13 an additional modification; and Figure 14 a further modification.

Figure 1 is a top view of the windshield wiper blade assembly embodying the invention;

Figure 2 is a side view of the blade assembly illustrated in Figure 1;

Figure 3 is a vertical section, taken substantially on line 3—3 of Figure 2 exemplifying certain details of construction;

Figure 4 is an enlarged side view of a portion of the assembly shown in Figure 2, depicting the operative connections between the ends of the secondary yokes and the support;

Figure 5 is a transverse section taken substantially on line 5—5 of Figure 2, showing other details of construction;

Figure 6 is an end view of the resilient wiper element;

Figure 7 is a side view of a portion of the blade assembly with the components arranged to illustrate one mode of their assembly;

Figure 8 is a perspective view of a modified form of construction showing one way of affording a snap connection between the ends of the secondary yokes and the flexible members of the support;

Figure 9 is an enlarged partial view showing the application of the components in Figure 8 to a wiper element;

Figure 10 is a transverse section taken substantially on line 10—10 of Figure 9;

Figure 11 is a view similar to Figure 9 illustrating another way in which the secondary yokes can be snapped into connection with the flexible members of the support;

Figure 12 is a transverse section taken substantially on line 12—12 of Figure 11;

Figure 13 is a transverse section similar to Figure 12 showing a further setup for effecting a detachable snap connection between a pressure device and a blade; and Figure 14 is a transverse section taken through an additional form of wiper assembly.

Referring first to the structure exemplified in Figures 1 through 7 of the drawings, the wiper blade assembly, among other things, includes a wiper blade and a pressure-distributing device.

More particularly, the wiper blade comprises a resilient wiper element generally designated 1 and an elongate uniformly flexible support detachably secured together. The pressure-distributing device may be constructed in various ways, but, as herein illustrated, preferably includes a pair of corresponding secondary yokes 2 and 3, a primary yoke 4, and a connector 5 for detachably connecting the assembly to a spring-pressed wiper arm. The ends of the secondary yokes are provided with receiving means 6 connected to the blade at longitudinally spaced points or locations and the ends of the primary yoke are pivotally connected to intermediate portions of the secondary yokes. The connector 5 is carried by the primary yoke.

The wiper element of the blade may be designed and constructed as desired, but as herein shown its sides are preferably provided with dovetail grooves 7 which form a neck or hinge portion 8. This element includes an attaching or back portion 9 and a wiper head portion 10 joined to the attaching portion by the hinge 8 so that the head portion may flop or move laterally with respect to the attaching portion when the blade is moved back and forth against a surface to be cleaned. The wiper element is also preferably provided with four transverse slots or notches 11 which more or less divide the attaching portion of the wiper element into longitudinally extending portions 12, 13, 14, 15 and 16. It will be noted that the portions 12 and 16 are relatively short and constitute end portions of the wiper element; that the portions 13 and 15 correspond with one another and are located between the ends of the secondary yokes; and that the portion 14 may be termed a center portion as it is located between the inner ends of the secondary yokes. It will also be noted that the wiper grooves 7 do not extend the full length of the wiper element, but terminate at the outermost notches 11, and each end portion 12 and 16 of the element is provided with a pair of corresponding holes 17 which receive the ends of the flexible members as shown in Figure 4.

The notches 11 are preferably of a length to intersect the longitudinally extending grooves 7 and extend into the wiper head portion 10 as shown in Figure 5. Attention is directed to the fact that the inner end or base portion of each notch constitutes what is termed abutment means 18 as exemplified in Figure 5 of the drawing.

The support for the wiper element may be designed and constructed as desired, but as depicted is comprised of a pair of corresponding members in the form of stays, flexible rods or wires 19 which are normally arranged entirely within the confines of the grooves 7 to lend stability to the wiper member and, as will be described more in detail subsequently, also serve to detachably connect the secondary yokes to the blade.

The ends of the secondary yokes may be connected to the blade in any desirable manner, but as herein shown each end is provided with the means 6 above referred to which receive the flexible members 19. Each receiving means preferably consists of a downturned end wall provided with an oblong opening 20 and a lower marginal edge portion 21.

The edge portions 21 constitute abutment means which are preferably located in a predetermined spaced relationship to the abutment means 18 so that the portions 21 will alternately engage the abutment means 18 and thereby control, within practicable limits, the range of flop or lateral movement of the blade with respect to the pressure device. This arrangement reduces to a minimum vibration and noise between the pressure device and the blade.

The pressure device and wiper blade shown in Figures 1 and 2 may be assembled and disassembled in various ways, but is preferably accomplished by placing the ends or receiving means 6 of the secondary yokes in the notches 11. One of the end portions, such as 16, of the wiper element is then pulled or stretched to the position illustrated in Figure 7, whereupon the flexible members of the support are threaded and/or extended through the oblong openings 20 of the secondary yokes and the grooves 7 to lock the flexible members in the grooves and at the same time hold the secondary yokes connected to such members. After the lead ends of the flexible members are seated in the holes 17 of the end portion, such as 12, the end portion 16 is released and manipulated so that the holes therein receive the exposed ends of the members as shown in Figures 2 and 4. The end portions 12 and 16 thus provide locks for holding the flexible members in the grooves 7 and the secondary yokes to the flexible members.

Attention is directed to the fact that the end portions of the flexible members extend outwardly predetermined distances beyond the outer ends of the secondary yokes and since the end portions 12 and 16 of the wiper element receive the end portions of the flexible members in a novel way the end portions of the wiper element are satisfactorily supported so that the wiping element will more readily conform to the surface to be cleaned. More specifically in this respect, attention is further directed to the fact that the end portions of the wiper element are reinforced by the end portions of the flexible members whereby to impart rigidity to the end portions of the wiper element so that they will be less resilient or flexible. This factor is of considerable importance because the extreme end portions of the wiper element are not actually supported by ends of secondary yokes extending beyond the ends of the wiper element. Imparting greater stability or rigidity to the end portions of the wiper element has proven very satisfactory in use and prevents excessive flop or lateral movement of the end portions when the blade is in operation. The end portions of the wiper element also serve to protect and prevent the end portions of the flexible members from scratching the surface to be cleaned.

Provision is made whereby a pressure device may be readily snapped into assembly and disassembly with respect to a wiper blade. One way of accomplishing this feature is illustrated in Figures 8, 9 and 10 of the drawing. More particularly, the wiper assembly shown in these figures preferably includes a pressure device having secondary yokes operatively connected to a blade and a primary yoke attached to the secondary yokes. The blade includes a resilient wiper element and a flexible support therefor preferably in the form of a pair of flexible members, corresponding to the flexible members 22. The sides of the resilient wiper element are provided with one pair of longitudinal extending grooves 23 which form a neck or hinge portion 24 hingedly connecting a wiper head portion 25 with an attaching portion 26. The attaching portion, in turn, is provided with side grooves 27, corresponding to the grooves 7, within which the flexible members 22 are confined. The wiper element is also preferably formed with four pairs of corresponding recesses 28 intersecting the grooves 27, each pair of recesses having a common longitudinally extending medial wall 29 therebetween. Assembly of the wiper element and flexible members is preferably effected by manipulating the ends of the wiper element so that the flexible members can be snapped broadside into the grooves for automatic retention therein, after which the ends of the wiper element are arranged so as to receive the ends of the flexible members. The snap connections between the flexible members and wiper element is due to the character of the grooves and flexible members.

The extremity of each secondary yoke is preferably provided with a channel formation which includes the base wall of the yoke and depending side walls 30. Each of the side walls is provided with corresponding inturned fingers 31, the ends of which are provided with generally semicircular notches 32 which are adapted to respectively receive the flexible members constituting the support for the wiper element. Each of the end formations is so constructed that the side walls including the fingers thereon may flex a limited extent relative to one another.

Detachable connection between the end formations of the secondary yokes with the blade is preferably accomplished by merely placing the channel formations of the secondary yokes over the wiper element in straddling relationship to the wall portions 29 of the element so that the notches 32 on the fingers of one side wall of the formation will receive one of the flexible members, after which the other flexible member is preferably manipulated or snapped into the notches of the other wall of the formation. The blade and pressure device can also be assembled by pressing the flexible members toward one another, and then arranging the end margins of the fingers on the secondary yokes in straddling relationship with the flexible members to locate flexible members in the notches to effect an interlock between the secondary yokes and the flexible members. The fingers are preferably rounded as indicated at 33 to facilitate piloting of the flexible members into the notches or seats.

Attention is directed to the fact that those portions of the flexible members which extend through the recesses 28 may flex slightly; that the flexible members when moved toward one another will compress the wiper element; and that the side walls 30 and fingers 31 of the formations may also flex or yield to some extent, all of which contribute to produce positive snap-acting connections between the secondary yokes and the flexible members.

Another way in which the secondary yokes can be detachably connected to the wiper blade is exemplified in Figures 11 and 12 of the drawing. As therein illustrated the wiper element, except for recesses 34 of lesser axial extent than recesses 28, substantially corresponds to the wiper element shown in Figures 9 and 10. The ends of the secondary yokes are provided with formations having side walls, each side wall having a pair of inturned flexible fingers 35 having seats 36 which yieldably detachably embrace flexible members 37 constituting the support for the wiper element.

The blade and pressure device are assembled in substantially the same manner as the device and blade illustrated in Figures 8 through 10, by merely arranging the components so that the flexible members will be snapped into engagement with the seats on the secondary yokes.

The modification illustrated in Figure 13 is similar to the two modifications shown in Figures 8 through 12, but affords an arrangement whereby the secondary yokes and flexible members can be readily connected without prior manipulation of the flexible members. More particularly in this regard, the ends of secondary yokes are provided with flexible fingers 38 having seats 39. The inner sides of the fingers are preferably bevelled as indicated at 40 and assist in piloting the flexible members into the seats. In this construction, the wiping element does not act to hold the members in the seats.

The modification illustrated in Figure 14 of the drawing comprises, among other things, a plurality of secondary yokes, the ends of which are preferably formed to provide a pair of corresponding longitudinally extending side walls having inturned portions 41, the opposed parallel marginal edges of which are provided with seats 42 which are adapted to receive flexible members 43. The portions 41 are rounded to provide cam surfaces 44. To assemble the pressure-distributing device and blade of this assembly, it is merely necessary to bring the device and blade together so that the cam surfaces will engage and press the flexible members toward one another and compress those portions of the wiper element therebetween to a point where the members flex or snap into the seats as clearly illustrated. Attention is directed to the fact that the lower extremities of the inturned portions 41 project inwardly a distance slightly greater than the upper portions thereof so as to establish positive connections between the secondary yokes and flexible members and thereby prevent accidental displacement of the flexible members from the seats 42.

The various forms of snap connections between the pressure device and blade described above are not claimed in the subject application.

In view of the foregoing it will manifest that various novel means have been provided for operatively connecting a pressure-distributing device with a wiper blade including a unique arrangement whereby the flexible members constituting the support for the wiper element can be snapped into connection with the wiper element. It will also be evident that the wiper element is provided with locking means for retaining the flexible members of the support in the grooves of the wiper element. Moreover, it will be apparent that the locking means on the wiper element serve to protect the ends of the flexible members and that such locking means in combination with the ends of the flexible members impart rigidity to the end portions of the wiper element so that they will more readily conform to the surface to be wiped. The arrangement also affords a setup whereby the resilience of the wiper element serves to detachably hold the flexible members in engagement with seats provided on the ends of the secondary yokes. Furthermore, due to the novel connections between the ends of the secondary yokes and flexible members the wiper assembly is made very silent in operation. This is partly due to the fact that portions of the wiper element constitute abutments which are alternately engaged by portions of the secondary yokes to control the flop or range of pivotal movement of the wiper blade with respect to the pressure device. It will be further noted that the components of the wiper assembly are so constructed and arranged that it is practically impossible for snow, sleet or ice to collect in the assembly and interfere with its operation.

Having thus described my invention, it is obvious that various other modifications may be made in the same without departing from the spirit of my invention; hence I do not wish to be understood as limiting myself to the exact forms, constructions, arrangements and combinations of parts herein shown and described or uses mentioned.

I claim:

1. A wiper blade assembly comprising a pressure device having a pair of longitudinally spaced receiving means, a blade comprising a wiper element provided with a pair of longitudinally extending grooves, and a pair of individual elongate flexible members seated in said grooves within the confines of the element and extending through the receiving means for locking the pressure device and blade together.

2. A windshield wiper blade comprising an elongate resilient wiping element having inwardly from each side thereof spaced-apart longitudinally extending opposed surfaces disposed to form an exterior groove, a pair of longitudinally extending flexible members resiliently held in said grooves by portions of said element, said element having side portions normally extending laterally adjacent and beyond said flexible members.

3. A windshield wiper blade assembly comprising a pressure device having a pair of longitudinally spaced formations provided with seats, a wiper blade comprising a resilient wiper element provided with longitudinally extending grooves, and support means having a pair of elongate flexible portions seated in the grooves and cooperating with the seats at locations spaced inwardly from the ends of the element for locking together the pressure device and support means, said wiper element being provided with a portion which may be manipulated to detachably lock the support means to the wiper element.

4. A windshield wiper blade assembly comprising an elongate resilient wiper element provided with a pair of longitudinal openings extending substantially throughout the length of the element, and support means having a pair of elongate flexible portions arranged in the openings, said wiper element having a longitudinal portion of appreciable length separating the flexible portions and having end portions interlocking with and covering the ends of the support means for retaining the flexible portions in the openings.

5. A windshield wiper blade assembly comprising an elongate resilient wiper element provided with a pair of longitudinally extending grooves adjacent its sides, a pair of elongate flexible members arranged within the confines of the grooves, notches provided in the element, means located in the notches and engaging the flexible members for holding the members against appreciable side movement in the grooves, and means carried by the element for embracing and substantially concealing the ends of the flexible members and restraining the flexible members against excessive longitudinal movement with respect to said element.

6. A windshield wiper assembly comprising a wiper element having a back portion and a wiping portion, longitudinally extending openings provided in the back portion, supporting means comprising a pair of supports extending through the openings, said back portion being interrupted to expose portions of the supports, and a pressure device having portions connected to the exposed portions of the supports, said element having portions extending beyond the ends of the supporting means for locking the latter to the element.

7. A windshield wiper blade comprising a resilient wiper element having a back portion and a wiping portion joined to the back portion in a manner whereby the wiping portion may flop relative to the back portion, said elements having grooves provided in the sides thereof and resiliently flexible means disposed in the grooves, said element having end portions extending beyond the flexible means for securing the latter to the element.

8. A windshield wiper assembly comprising a blade and a pressure device, said blade comprising a wiper element having a back portion and a wiping portion, grooves provided in the element, elongate flexible means comprising flexible supports extending through the grooves, said back portion being interrupted to expose portions of the supports, said pressure device having portions pivotally connected to the exposed portions of the supports, and abutment means provided on the pressure device alternately engageable with the wiper element for controlling the range of pivotal movement between the blade and pressure device.

9. A windshield wiper assembly comprising a wiper blade and a pressure device, said blade comprising a wiper element and a support carried by the element, said pressure device comprising a pair of secondary yokes having their ends connected to the blade at longitudinally spaced points, and a primary yoke having its ends connected to the secondary yokes, said primary yoke having means for attaching the blade assembly to a wiper arm, said wiper element being provided with integral portions located outwardly from the outer ends of the support for limiting relative longitudinal movement between the support and element, at least one of said portions providing an abutment inwardly of the end of said support and engageable with one of said secondary yokes for limiting longitudinal movement between the element and pressure device.

10. A wiper assembly comprising a pressure device having a pair of longitudinally spaced receiving means, a blade comprising a wiper element provided with a pair of longitudinally extending grooves, and a pair of elongate flexible members seated in the grooves and cooperating with said receiving means within the confines of the element for detachably locking the pressure device and blade together.

11. A windshield wiper blade comprising a resilient wiper element having a wiping portion and an attaching portion, said attaching portion being provided with a pair of longitudinally extending exteriorly exposed grooves, and elongate resiliently flexible support means secured in the grooves, said wiper element having at each of its sides a portion intermediate the support means and the wiping portion the width of which intermediate portion is greater than the width of the support means in order that the exterior marginal edge portions of the support are inset with respect to the exterior marginal edges of said intermediate portion.

12. A wiper blade assembly comprising a resilient wiper element having a pair of parallel oppositely facing grooves formed in its exterior side walls and running lengthwise thereof, and flexible support means having a pair of portions seated in the grooves, said element having end portions provided with means receiving the ends of the support means for retaining said portions of the support means in said grooves.

13. A windshield wiper blade comprising an elongate resilient wiper element having a wiping portion and an attaching portion, said attaching portion being provided with a groove formed in each of its exterior side walls, said grooves being parallel and facing in opposite directions, and resiliently flexible support means having portions disposed in the grooves, said wiper element having portions extending outwardly from the support means to prevent the latter from engaging a surface to be wiped.

14. A windshield wiper blade comprising an elongate resilient wiping element having inwardly from each side thereof spaced-apart longitudinally extending opposed surfaces disposed to form an exterior groove, and support means having a pair of longitudinally extending flexible portions held in said grooves and having outer marginal surfaces, said element having side portions extending laterally beyond the outer marginal surfaces of said flexible portions.

15. A wiper assembly comprising a pressure device having a pair of longitudinally spaced connecting means, a blade comprising a wiper element provided with a pair of longitudinally extending exteriorly exposed grooves, and support means having elongate flexible portions seated in the grooves and connected with said connecting means, said wiper element having side portions disposed laterally of the flexible portions to substantially prevent one of the connecting means from engaging a surface to be wiped by the element.

16. A wiper assembly comprising an elongate resiliently flexible wiper blade and an elongate pressure device provided with a connector for attaching the assembly to a wiper arm, said blade including an elongate resilient wiping element provided with exteriorly exposed side grooves, support means for the element, said support means having elongate portions disposed in the grooves along the sides of the element, and longitudinally spaced means provided on the pressure device and connected with the support means for applying pressure thereto at longitudinally spaced points, said wiping element having portions disposed outwardly from a point of pressure application in a manner whereby to substantially prevent one of said spaced means of the pressure device from engaging a surface to be wiped by the element.

17. A wiper assembly comprising an elongate wiper blade having a resilient wiper element and elongate flexible supporting means therefor having spaced-apart elongate exposed portions disposed along the sides of the element, and a pressure device provided with means connecting it with the supporting means, said wiper element having portions disposed laterally beyond said elongate portions of the supporting means so as to substantially prevent the connecting means from engaging a surface to be wiped by the element.

18. A windshield wiper blade comprising an elongate resilient wiping element having in each side thereof a longitudinally extending exterior groove, a longitudinally extending flexible member slidably disposed within the confines of each groove, abutment means carried by the extremities of the blade for limiting the extent of the sliding movement of the members in the grooves, and a pressure device operatively connected with the blade for applying pressure thereto at longitudinally spaced points.

19. A windshield wiper blade comprising an elongate resilient wiping element provided with a longitudinally extending exterior groove in each side thereof, a pair of support means respectively disposed in the grooves for relative longitudinal sliding movement, means carried by the blade for limiting the extent of the sliding movement of said support means, and a pressure device operatively connected with the blade for applying pressure thereto at longitudinally spaced points.

20. The structure defined in claim 19, in which the wiping element has side portions disposed laterally of the support means in a manner whereby to substantially prevent the support means from engaging a surface to be wiped by the element.

21. A windshield wiper blade comprising a resilient wiper element provided with a pair of longitudinally extending grooves forming a hinge joining a wiping portion and an attaching portion of the element, said attaching portion being provided with a pair of longitudinally extending grooves, a resiliently flexible support having portions secured in the grooves provided in the attaching portion, and said wiper element having a portion intermediate the support and the wiping portion which it as least greater than the width of the support in order that the exterior marginal edge portions of the support are inset with respect to the exterior marginal edges of said intermediate portion.

References Cited in the file of this patent

UNITED STATES PATENTS

| | | |
|---|---|---|
| 2,543,383 | Scinta | Feb. 27, 1951 |
| 2,596,063 | Anderson | May 6, 1952 |
| 2,658,223 | Enochian | Nov. 10, 1953 |
| 2,679,065 | Nesson | May 25, 1954 |
| 2,712,146 | Wise | July 5, 1955 |
| 2,727,270 | Bosso | Dec. 20, 1955 |
| 2,782,448 | Anderson | Feb. 26, 1957 |

FOREIGN PATENTS

| | | |
|---|---|---|
| 670,922 | Great Britain | Apr. 30, 1952 |
| 683,375 | Great Britain | Nov. 26, 1952 |

UNITED STATES PATENT OFFICE
CERTIFICATE OF CORRECTION

February 23, 1960

Patent No. 2,925,615

Fred A. Krohm

It is hereby certified that error appears in the printed specification of the above numbered patent requiring correction and that the said Letters Patent should read as corrected below.

Column 5, line 2, for "noches" read -- notches --; column 7, line 68, after "support" insert -- means --; column 9, line 14, strike out "it as" and insert instead -- is at --.

Signed and sealed this 22nd day of November 1960

(SEAL)
Attest:

KARL H. AXLINE
Attesting Officer

ROBERT C. WATSON
Commissioner of Patents